May 2, 1933. M. I. DORFAN 1,907,197
CONTINUOUSLY OPERATING DUST COLLECTOR
Filed Sept. 17, 1930 6 Sheets-Sheet 3
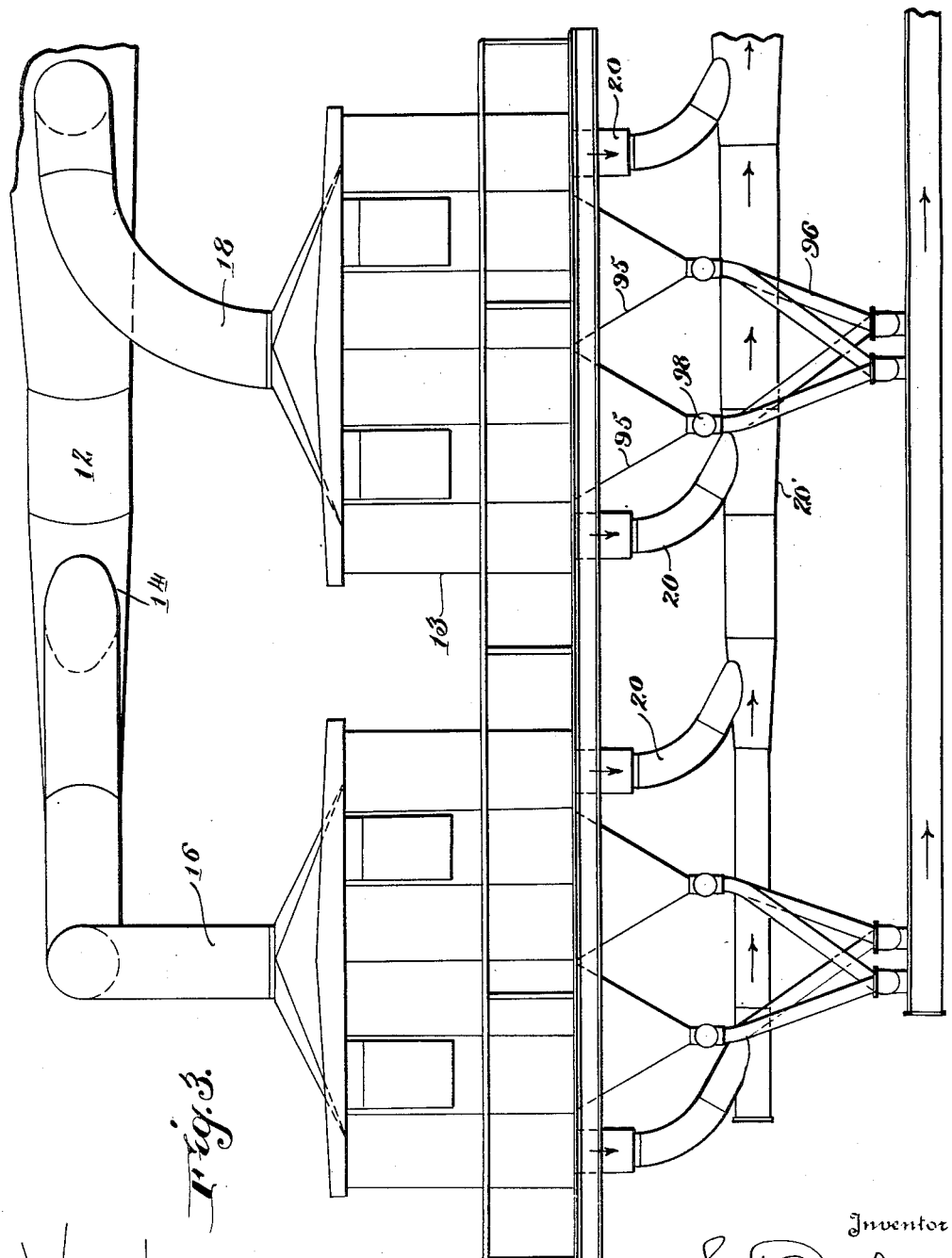

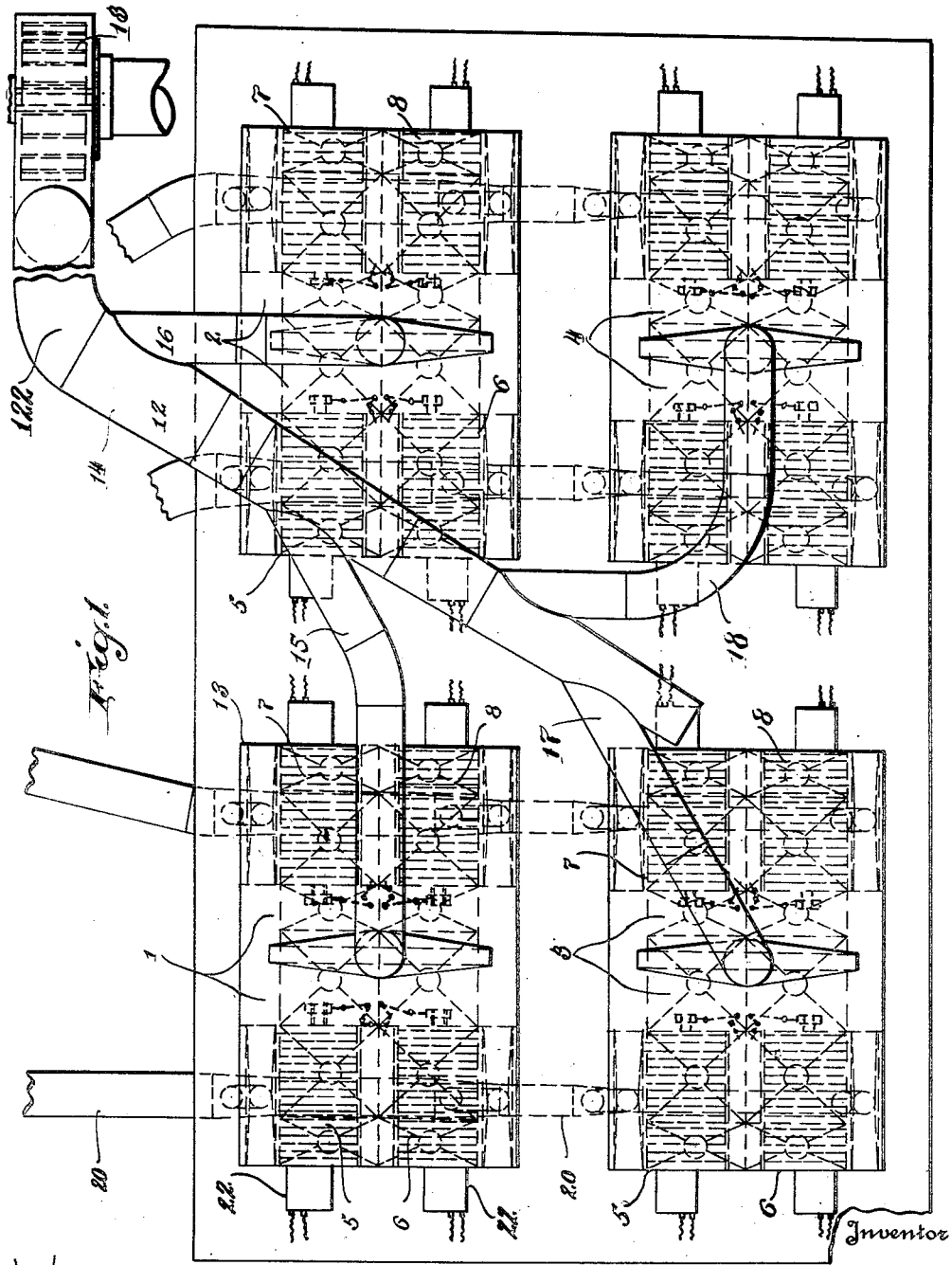

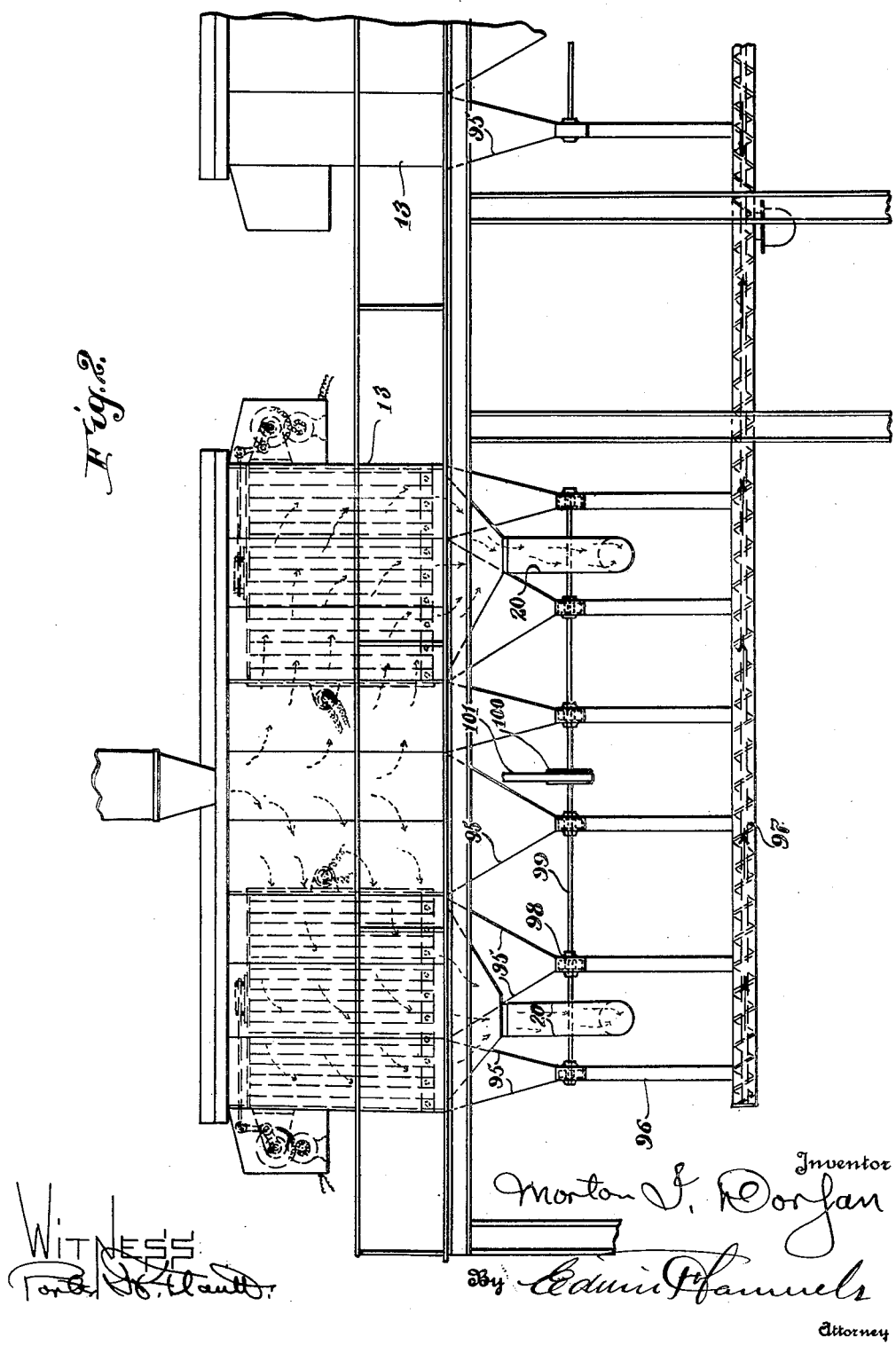

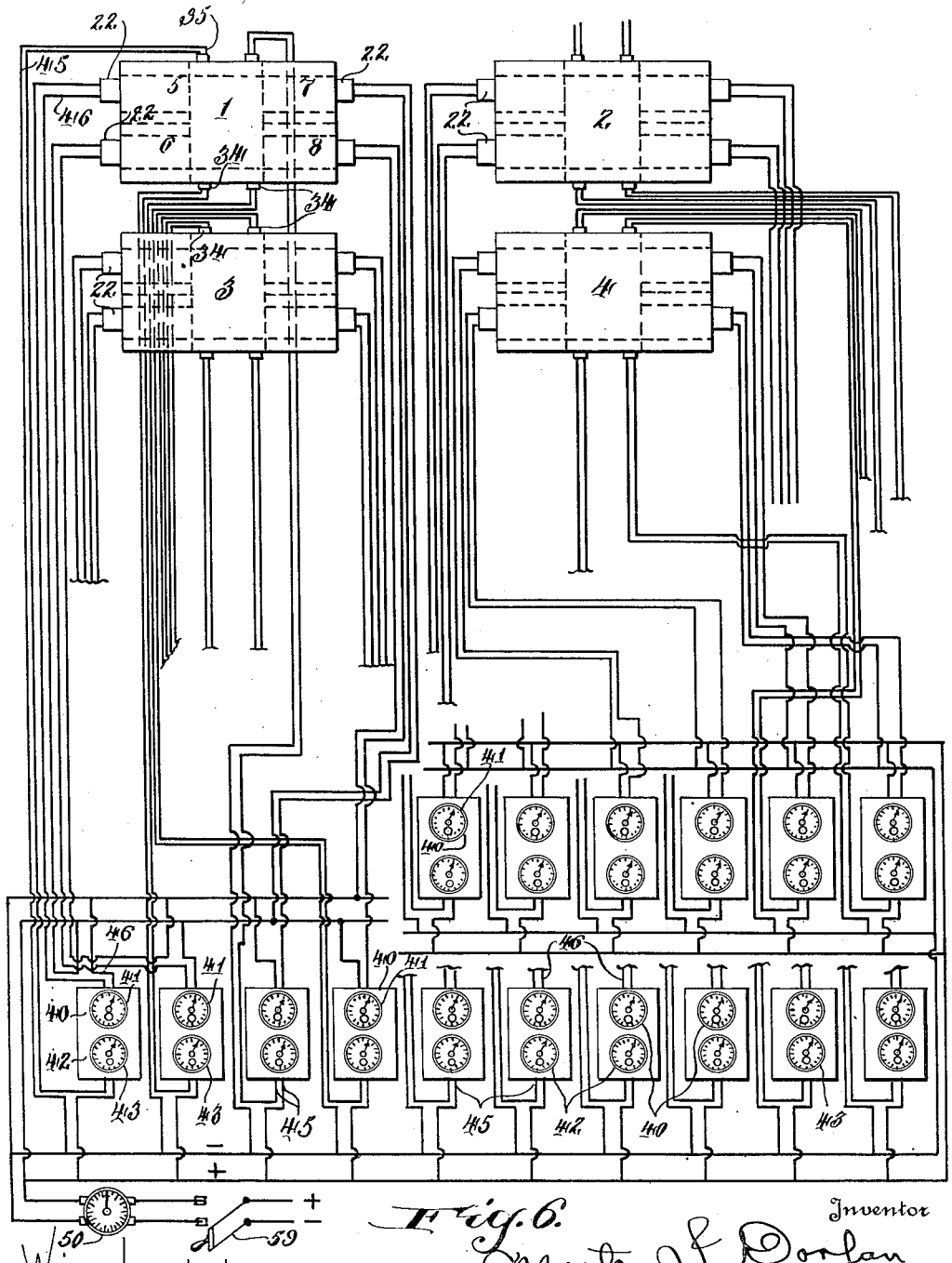

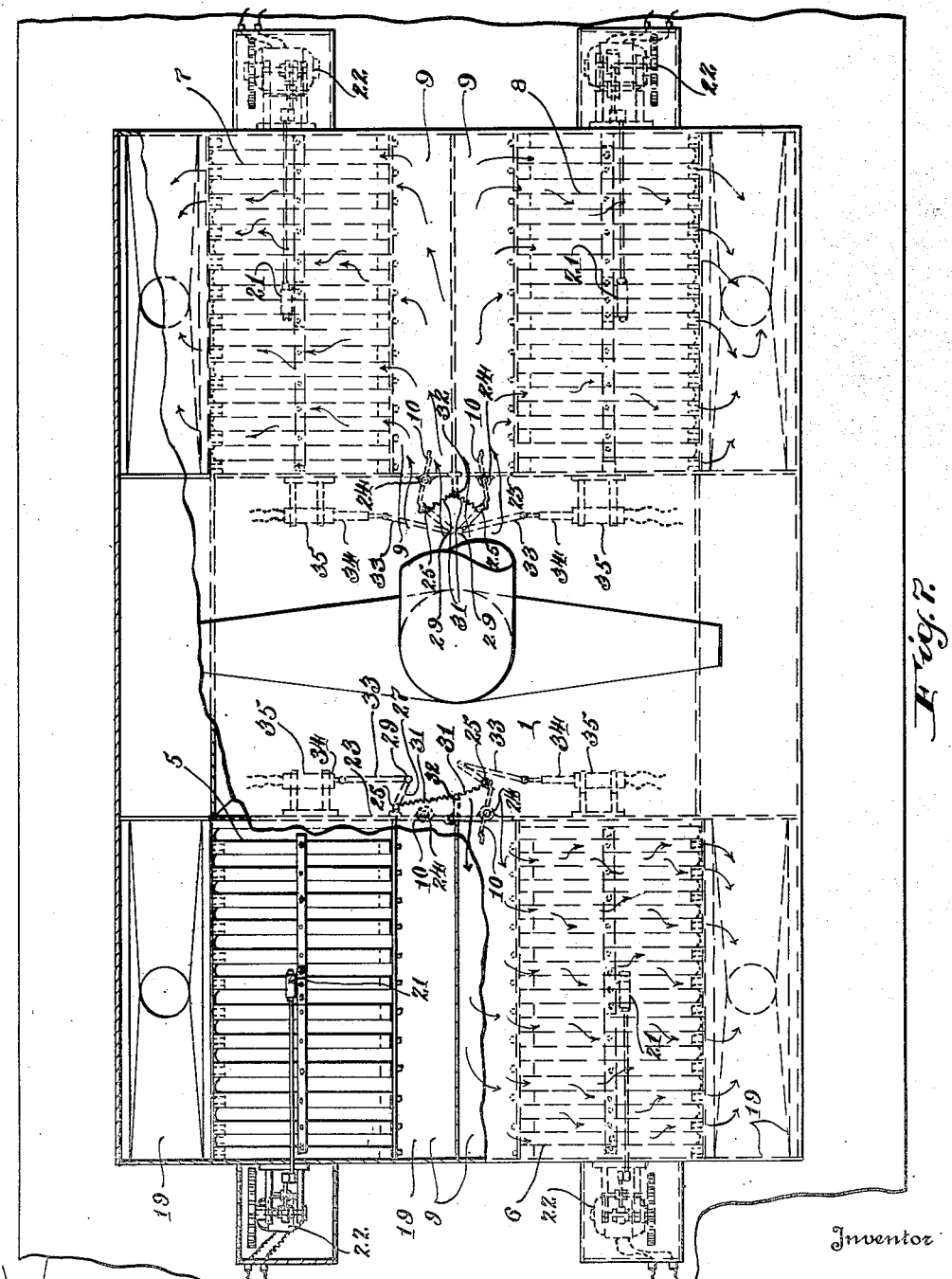

Patented May 2, 1933

1,907,197

UNITED STATES PATENT OFFICE

MORTON I. DORFAN, OF HAGERSTOWN, MARYLAND, ASSIGNOR TO PANGBORN CORPORATION, OF HAGERSTOWN, MARYLAND, A CORPORATION OF MARYLAND

CONTINUOUSLY OPERATING DUST COLLECTOR

Application filed September 17, 1930. Serial No. 482,400.

The invention relates to a new practice and to a new apparatus in the nature of a continuously operating dust collector, particularly adapted for use in connection with coal cleaning plants, but capable of more general application.

The preferred construction shown provides a plurality of classifier or settling chambers and a corresponding number of screen banks or sections. In the installation shown the settling chambers are four in number and each settling chamber is connected to a plurality of screen sections. In this form of apparatus there are two screen sections on each side of each settling chamber, though it is clear that the number of classifier chambers or settling chambers may be varied, likewise the number of screen sections to each settling chamber. The settling chambers are in turn connected by means of a manifold to a source of dust laden atmosphere to be cleaned. As already pointed out, the continuous automatic cloth screen dust collector herein disclosed and the method of operation described have been devised with particular reference to their operation in connection with a coal cleaning plant for cleaning the dust laden atmosphere therefrom to dispense with supervision, to give continuous operation with successive automatically controlled cleaning of the screen sections and to provide the large capacity required for this work and hence to prevent the escape of the coal dust and to eliminate the nuisance due to the contamination of the atmosphere in this way.

In the operation of the apparatus, all of the classifier chambers or settling chambers are always receiving dust, but at least one of the screen sections or banks in the entire apparatus is always shut off and going through the process of being automatically cleaned and prepared for further operation. In the apparatus designated which comprises four classifier chambers or settling chambers and sixteen screen sections, a fixed proportion preferably one section would be shut off at all times, being subjected to the cleaning operation, the other fifteen being open to the dust screening operation. After a definite and variably controllable period of time, this one screen section which had been shut off having been automatically cleaned, would be automatically opened to the stream of dust laden air and another one or more, depending on the proportion closed in the previous operation, would be shut off and cleaned. In accord with the established practice, the cloths of each screen section thus shut off from the current of dust laden air for cleaning are vibrated to loosen the accumulation of dust and this dust is permitted to settle into the hoppers.

The invention further provides an automatic variable time control for the vibrators and air valves or gates, which will control and time the period during which dust laden air is permitted to go to each screen bank and also control and time the interval between the termination of the vibratory action and the opening of the valve which again permits the dust laden air current to flow.

During the shut off period for any screen section or bank, the corresponding vibrator which is operated by an electric motor would be run for a variably controlled period and would be shut down automatically, long enough prior to the opening of the corresponding valve or gate to allow the dust to settle and to pass out of the machine through the dust outlets into the hoppers or other receptacles provided for this purpose. All of these periods are variable at the will of the operator. The cycle of operations would cover a definite and regular period of time during which each screen bank would be cleaned once and the cycle automatically repeated.

On the closing of the starting switch a signal lamp which may be included in the circuit will be lighted indicating that the apparatus is in operation or any other signalling device may be employed and included.

Assuming that the apparatus is at the beginning of the cycle of operations, the valve gate controlling the first screen section or bank will be closed in accordance with the preferred timing after a delay of five seconds or any suitable period following the closing of the valve gate, the corresponding vibrator motor will start up and run for a predetermined period, say, five minutes, after which it will be stopped and a predetermined interval will be permitted to elapse providing for the settling of the dust, after which the valve gate will open, the valve gate of the next section being simultaneously closed and the corresponding vibrator motor started after a suitable interval. The same operation will then be repeated as to the second screen bank and each successive unit will be similarly operated in turn until the sixteen or any suitable number of cleaning operations have been completed. Upon the completing of the cycle, the first unit will be again shut off and cleaned and the cycle will thus be repeated, the sequence of operations being maintained as long as the equipment is in use, the respective periods of vibration and of valve operation being variable and adjustable at the will of the operator.

In the accompanying drawings I have illustrated a continuous automatic dust collector apparatus embodying the features of my invention in the preferred form. This apparatus is also capable of being utilized in the performance of the method of the invention.

In the drawings:

Figure 1 is a top plan view more or less diagrammatic in nature of an apparatus in accordance with the invention comprising four settling chambers and sixteen screen sections.

Figure 2 is a fragmentary side elevation of the same on an enlarged scale, one group of screen sections being broken away at the right.

Figure 3 is an end elevation of the apparatus, i. e., a view taken at right angle to Figure 2.

Figure 6 is a circuit diagram illustrating one of the various forms of electric circuit which may be used for this purpose.

Figure 7 is a plan view of a single settling or classifier chamber and the screen sections connected thereto shown on an enlarged scale.

Figures 4, 5:
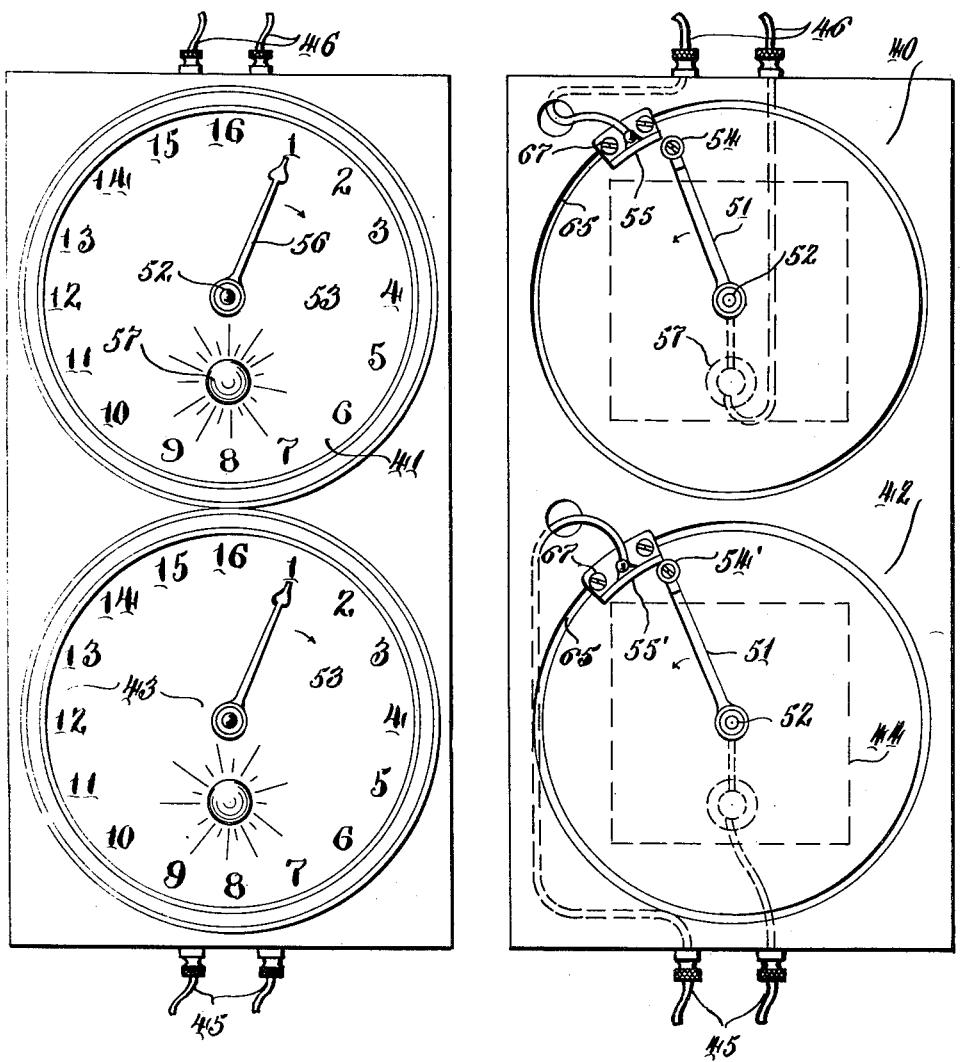
Figure 4 is an external plan of the timing indicator for a single screen section.
Figure 5 is a view of the timing switches for a single screen section, the dial face and hand being removed. This view also shows the casing for the actuating element which may be either electrical or mechanical clockwork or other suitable timing apparatus.

Referring to the drawings by numerals, the construction shown comprises four settling or classifying chambers 1, 2, 3 and 4, respectively. Each of these chambers has connected to it four or any suitable number of cloth screen dust collector sections or banks 5, 6, 7, 8, two of which sections are arranged on each side of the corresponding classifier or settling chamber 1, 2, 3, 4, each section being connected to the chamber by a corresponding intake or dust laden air passage 9, see Figure 7, controlled by a corresponding valve 10, which when closed tends to cut the air supply off from the corresponding screen sections and to relieve these corresponding screen sections of the air pressure.

The respective settling chambers 1, 2, 3, 4 are connected to a source of dust laden atmosphere to be cleaned by means of a manifold 12, comprising a main pipe 14 into which the dust laden atmosphere is forced by means of a blower 13 and branch pipes 15, 16, 17, 18 leading to the respective settling chambers 1, 2, 3, 4 supplying the apparatus with dust-laden air under pressure. Each screen section 5, 6, etc. has also a clear air chamber or side 19 to which is connected a discharge pipe 20 for discharging clear air to the outside or to any suitable locality or in the coal cleaning operation or any operation where considerable volumes of air are handled the cleaned air may be returned to the tables or other point where it is used and thus reintroduced into circulation. In Figures 2 and 3, in which the dust collectors are shown in elevation, the respective screen banks and supplying or classifying chambers are provided with any suitable type of hoppers 95 from which the dust removed from the screens and permitted to settle prior to and during the cleaning operation is led by way of down pipes 96 to a suitable conveyor 97, which may be a screw or any suitable type of conveyor, the discharge of the material from the hoppers being in the form of the invention shown controlled by rotary discharge valves 98 operated by discharge valve shaft 99, the shaft being driven by a pulley 100 and belt 101, or in any suitable manner. The arrangement of the hoppers and discharge pipes is not material to the present invention and the air to be cleaned may be moved by either pressure or suction.

Each screen section is provided with the usual or any suitable vibrating means 21 operated by a corresponding vibrator motor 22. The automatic shut off valves 10 may be operated in any suitable manner as by means of the spring and lever mechanism illustrated in Figure 7. This portion of the illustration is diagrammatic, the door actuating mechanism being preferably outside the casing. In accordance with the illustration, each valve or gate 10 in the wall 23 between the settling chamber and the corresponding screen section is pivoted at the center at 24 and connected by a pivot pin 25 at one end of the gate to a swinging arm 27, which is pivotally connected at its opposite end at 29 to a thrust rod 33 which is pivotally connected to the core 34 of a solenoid 35. Each valve is provided with a tension spring 31 connected at one end to the pin 25 and at the other end to an eye or other suitable point of anchorage at 32 so that the valve is by operation of the spring maintained normally open. The solenoid being normally out of circuit, the valve is normally open and is closed when the solenoid is energized. The gate leading to section 5 connected to settling chamber 1 is shown as closed, the other gates being open.

Referring now to the circuit diagram Figure 6, which shows diagrammatically the classifier or settling chambers 1, 2, 3 and 4, with their cooperating dust collector screen sections 5, 6, 7, 8, vibrator motors 22 and valve solenoids 35 and to Figure 5 it will be noted that there is a time controlled switch 40, with a corresponding indicator 41 for each vibrator motor 22 of each screen section and a time switch 42 with an indicator 43 for the valve actuating solenoid 35 corresponding to each screen section so that in the form of the invention shown there are sixteen of the time switches 40, one for each of the sixteen vibrator motors, and sixteen of the time controlled switches 42, i. e., one for each valve. Current is supplied from any suitable source by way of positive and negative bus lines indicated by plus and minus signs, respectively, and each of the valve solenoids 35 is connected to the opposite sides of the line through the corresponding time switch 42, the connection for this purpose being indicated by reference character 45 and each of the vibrator motors 22 is connected to the opposite sides of the line through and by way of circuit 46, each circuit 46 being controlled by a corresponding time switch 40, and all the switches of the entire series if desired may be controlled and synchronized by a single master switch 50. This may be used to maintain and control the relation between the other time elements, being operated by any suitable clock or other timing mechanism, electrical or mechanical, the time elements of the switches 40, 42, providing for independent adjustment of the period of operation of each switch and each vibrator motor.

Referring now to Figures 4 and 5, illustrating in detail the time switches 40, 42, it will be noted that each of these switches comprises an arm 51 pivoted at the center 52 of the dial 53 and having at its outer end a suitable contact member 54 which may be in the form of a roller. Having particular reference to the switch 40 which controls the corresponding vibrator, it will be noted that a stationary contact 55 of the desired length corresponding to the period of operation of the vibrators is provided in the path of the moving contact member 54. Each of the circuits 46 is connected to the contact member of the switch 40 after the manner shown, one side of the line being connected to the arm 51 at the pivot 52 and the other side to the stationary contact 55. The position of the arm 51 and hence the moving contact member 54 is indicated at all times and in any suitable manner by means of the pointer 56 which preferably overlies the switch arm 51, being mounted on the same pivot pin or shaft indicated by reference character 52.

Each dial 53 may to advantage be provided with a light 57 shown in Figure 4 and also indicated as to its relative position in dotted lines in Figure 5. This light serves to show when the particular circuit is energized, indicating the open position of the valve and the period of operation of the corresponding vibrator motor.

Referring to Figure 5, it will be noted that the stationary contact member 55' of the switches 42 which control the respective valve gates is longer than the stationary contact 55 of the switches 40 which control the vibrator motors so that the period of time corresponding to the closed position of each valve or gate is longer than the period of operation of the corresponding vibrator motor, the former being referred to in the preamble as a period of possibly five minutes, giving the dust raised by the vibrator a chance to settle into the hopper before the valve is opened, placing the screen section again in operation, and the contact members 55 and 55' are made adjustable circumferentially in the slots 65 in which they are secured by screws 67, also the contact members 55 and 55' being conveniently removable may be made in series of graduated lengths to give a definite variation and maintain any desired relation of the time periods.

In the operation of the apparatus, the electrical control circuit is first closed by means of any suitable control switch 59, see Figure 6. At this time the position of the control switches 42 will be such that one of the gate valves 10 will be immediately closed by the resulting energization of the corresponding solenoid 35. At the same time or immediately thereafter, depending on the exact position of the variable time control switches 40, 42, the corresponding vibrator motor 22 will be energized so that one of the cloth screen sections 5, 6, 7, 8 connected to one of the settling chambers 1, 2, 3, 4 will be cleaned, all the remaining sections being in operation, i. e. open to flow of dust.

At the end of the period of operation of the motor, as determined by the variable time switch 40, the motor circuit is broken by the passing of the moving contact 54 from its engagement with the fixed contact 55. As already pointed out, the stationary contact member 55' of the valve switch being longer than the contact 55, the corresponding gate valve 10 remains closed for an additional period after the corresponding vibrator is stopped, five minutes being designated as a convenient time during which any gate valve may be closed, including the operation of the vibrator and the period during which the dust raised by the vibrator in the particular screen section in question is permitted to settle into the hopper or otherwise to pass from the unit. The valve gate is then permitted to open by the passing of the moving contact member 54' from the fixed contact member 55'. Within a short period thereafter designated above as five seconds, the switches 42, corresponding to the next cloth screen section, come into contact so that the valve gate 10 controlling this unit is immediately closed, and the corresponding vibrator motor 22 being energized by the closing of the switch 40. The set of operations thus described is repeated and is further repeated successively as to each of the screen sections.

Regarding the timing switches, it is obvious that the closing of the successive contacts 54, 55, and 54', 55' in regular order can be accomplished either by a corresponding series of timing members 40, 42, as shown in Figure 6, with or without a single central control 50.

An important feature of the use of the multiple time controls which may be either mechanically or electrically operated, i. e., by mechanical clockwork or electrical timing mechanism or clockwork time relays and the like indicated in Figures 4 and 5 as clockwork mechanism 44, is that by the ordinary method of clock regulation a variable time control of the classifiers or settling chambers and of the corresponding cloth screen sections may be maintained by the control of valves 10 and variable time control of the vibrators which, in turn, gives variable time control of the complete cycle of operations of any group or number of units with satisfactory continuous operation. This result as to variable time control may also be accomplished by changing the position and length of contacts 55, 55'.

In accordance with the new practice relating to the use of this continuously operating apparatus for coal cleaning operations, a number of dust collectors or cloth screen sections, each series comprising two to four or more sections 5, 6, 7, 8, are grouped about a single corresponding settling chamber, 1, 2, 3, 4, of which there may be any suitable number, the settling chambers being in turn connected by means of a manifold to the source of dust laden atmosphere to be cleaned. In accordance with this practice, all of the settling chambers or classifiers are always receiving dust, but one or a corresponding portion of the screen sections is always shut off from the dust stream, and being put through the cleaning process, the remaining screen sections being in operation. If there were four settling chambers and a corresponding number of screen sections, as sixteen in the present instance, one might be shut off and cleaned while the other fifteen were operating. Now after a variable definitely controlled period of time, this section that has been shut off will be automatically opened to the dust stream and another one, that is, one of the other fifteen or more or less, as the case may be, will be shut off and subjected to a similar cleaning operation.

During the shutoff period the corresponding vibrator motor will be run for a variably controlled period of time and will be shut down automatically long enough before the corresponding valve is opened for the dust to settle and pass out of the dust collector section through the dust outlets. Each screen section will be shut off automatically and cleaned in turn and returned to operation, the sections being cut off and cleaned successively, comprising a cycle of operations which will be repeated so long as the apparatus is in operation.

I have thus described specifically and in detail a continuously operating dust arresting apparatus comprising a number of classifying chambers, each connected to corresponding cloth screen banks with means for cutting off and cleaning the screen banks successively, including variable time control apparatus for automatically timing and controlling the periods during which the respective screen banks are thus cut off and vibrated and returned to circulation. The description of this apparatus of which a single form is shown and described for purposes of illustration is specific and in detail in order that the nature, manner of constructing, operating and using the same and practicing the invention may be fully understood, however, the construction of the apparatus and of the arrangement of the same may be widely varied within the scope of the invention, the terms being used in a descriptive rather than in a limiting sense, the scope of the invention being defined in the claims.

What I claim as new and desire to secure by Letters Patent is:

1. In a dust collecting apparatus a plurality of settling chambers, means for supplying dust laden air to said settling chambers and a plurality of cloth screen filter banks on each side of each settling chamber, a valve for cutting off each screen bank from its settling chamber, means for vibrating the screen banks to clean them, and an automatic electric time control for operating the valves to cut off the circulation of dust laden air from each screen bank in turn and reintroducing the bank into circulation, and means for controlling the vibrators to operate each corresponding vibrator in turn to vibrate each screen during its cutoff period providing for continuous operation.

2. In a continuously operating dust collecting apparatus a plurality of settling chambers, means for supplying dust laden air under pressure to said settling chambers and a plurality of cloth screen filter banks on each side of each settling chamber, a valve for cutting off each screen bank from its settling chamber, means for vibrating the screen banks to clean them, and an automatic time control for operating the valves to cut off the circulation of dust laden air from each screen bank in turn and reintroducing each said screen bank into circulation, and means for controlling the vibrators to operate each corresponding vibrator in turn to vibrate each screen during its cut-off period and means for varying the periods of operation of said time control.

3. The combination in a continuously operating dust arrester of a plurality of settling chambers, means for supplying dust laden air thereto, a plurality of screen banks on each of two opposite sides of the settling chambers, valve gates between each screen bank and the corresponding settling chamber for cutting off the air current from each screen bank in turn, means for removing the dust thus collected from each screen bank when thus cut off, whereby all of the settling chambers may be kept in continuous operation, the respective screen banks being cut off from the dust laden air current in turn and cleaned.

Signed by me at Hagerstown, Washington County, Maryland, this 2nd day of September, 1930.

MORTON I. DORFAN.